(12) United States Patent
Cowell et al.

(10) Patent No.: US 10,978,024 B2
(45) Date of Patent: Apr. 13, 2021

(54) SPEED OF SERVICE SYSTEM

(71) Applicant: Pilot Travel Centers LLC, Knoxville, TN (US)

(72) Inventors: Olga Cowell, Knoxville, TN (US); Tim Wroblewski, Knoxville, TN (US)

(73) Assignee: Pilot Travel Centers, LLC, Knoxville, TN (US)

( * ) Notice: Subject to any disclaimer, the term of this patent is extended or adjusted under 35 U.S.C. 154(b) by 0 days.

(21) Appl. No.: 16/162,585

(22) Filed: Oct. 17, 2018

(65) Prior Publication Data

US 2019/0114995 A1 Apr. 18, 2019

Related U.S. Application Data

(60) Provisional application No. 62/573,221, filed on Oct. 17, 2017.

(51) Int. Cl.
| | | |
|---|---|---|
| *G09G 5/22* | (2006.01) |
| *B67D 7/22* | (2010.01) |
| *G06Q 10/04* | (2012.01) |
| *B60S 5/02* | (2006.01) |
| *G06F 3/147* | (2006.01) |

(52) U.S. Cl.
CPC ............... *G09G 5/22* (2013.01); *B60S 5/02* (2013.01); *B67D 7/222* (2013.01); *G06F 3/147* (2013.01); *G06Q 10/04* (2013.01); *G09G 2370/025* (2013.01); *G09G 2380/06* (2013.01); *G09G 2380/10* (2013.01)

(58) Field of Classification Search
CPC .. G09G 5/22; G09G 2380/06; G09G 2380/10; G09G 2370/025; G06F 3/147; B60S 5/02; G06Q 10/04; B67D 7/222
See application file for complete search history.

(56) References Cited

U.S. PATENT DOCUMENTS

| | | | | |
|---|---|---|---|---|
| 5,163,000 A * | 11/1992 | Rogers | ................... | G06Q 10/06 701/1 |
| 7,379,897 B2 * | 5/2008 | Pinkus | ..................... | G07C 9/28 705/16 |
| 10,157,364 B1 * | 12/2018 | Koeppel | ............... | G06Q 10/083 |
| 2002/0111768 A1 * | 8/2002 | Ghorayeb | .............. | G07B 15/02 702/178 |
| 2004/0093418 A1 * | 5/2004 | Tuomi | .................... | H04L 63/08 709/228 |
| 2004/0187399 A1 * | 9/2004 | Andree | ................. | E04H 1/1233 52/79.1 |
| 2005/0184155 A1 * | 8/2005 | Pinkus | ..................... | G07F 7/02 235/449 |
| 2007/0076648 A1 * | 4/2007 | Yong | ..................... | H04L 51/066 370/328 |
| 2007/0261760 A1 * | 11/2007 | Harrell | ..................... | B67D 7/22 141/197 |
| 2010/0023162 A1 * | 1/2010 | Gresak | ................. | G07F 13/025 700/241 |

(Continued)

*Primary Examiner* — Ibrahim A Khan

(74) *Attorney, Agent, or Firm* — Nexsen Pruet, PLLC; Seth Hudson

(57) ABSTRACT

A speed of service system includes a ground layer, a sensor positioned within the ground layer, a radio communicatively coupled to the sensor, a sign controller receiving a signal from the wired radio, and a visual display displaying information obtained by the sensor.

13 Claims, 2 Drawing Sheets

(56) References Cited

U.S. PATENT DOCUMENTS

| | | | | |
|---|---|---|---|---|
| 2011/0313893 | A1* | 12/2011 | Weik, III | G07B 15/02 |
| | | | | 705/28 |
| 2012/0162422 | A1* | 6/2012 | Lester | G07F 13/025 |
| | | | | 348/148 |
| 2012/0282921 | A1* | 11/2012 | Motola | H04W 4/14 |
| | | | | 455/426.1 |
| 2013/0257687 | A1* | 10/2013 | Chun | H04N 21/4122 |
| | | | | 345/2.3 |
| 2014/0063263 | A1* | 3/2014 | Bernal | H04N 5/23296 |
| | | | | 348/169 |
| 2014/0350847 | A1* | 11/2014 | Ichinokawa | G01C 21/00 |
| | | | | 701/468 |
| 2016/0019526 | A1* | 1/2016 | Granbery | G01S 1/00 |
| | | | | 705/26.81 |
| 2016/0173337 | A1* | 6/2016 | Lea | H04L 43/0811 |
| | | | | 370/254 |
| 2017/0053250 | A1* | 2/2017 | Bowers | G07F 17/24 |
| 2017/0098285 | A1* | 4/2017 | Smith | G06Q 50/06 |
| 2018/0029869 | A1* | 2/2018 | Carapelli | B67D 7/16 |
| 2018/0106654 | A1* | 4/2018 | Kim | G06Q 50/06 |

* cited by examiner

SPEED OF SERVICE SYSTEM

CROSS-REFERENCE TO RELATED PATENT APPLICATION

The present patent application/patent claims the benefit of priority of U.S. Provisional Patent Application No. 62/573,221, filed on Oct. 17, 2017, and entitled "SPEED OF SERVICE SYSTEM," the contents of which are incorporated in full by reference herein.

FIELD OF THE INVENTION

The present invention relates generally to a speed of service system, and more generally relates to a speed of service system that incorporates a sensor for instigating a timer for timing a vehicle, such as a truck at a particular location.

BACKGROUND OF THE INVENTION

When a professional driver drives his or her truck into a travel center and pulls up to a fuel lane, it impossible to determine the length of time a previous truck has occupied the fuel lane. When all fuel lanes are full, it is a guessing game about which fuel lane to wait for because the occupancy time is almost impossible to know. Unlike an automobile, it is not reasonable for a 80 foot long and 80,000 lb. truck to easily back up and pull into another fuel lane. Instead, the professional driver usually must stay in line at the fuel lane initially chosen.

As such, it is the intention of the present invention to provide the professional driver with a visual display showing the amount of time a truck has occupied a specific fuel lane. Additionally, data associated with occupancy of fuel lanes and time of occupancy may be collected by a central data system.

BRIEF SUMMARY OF THE INVENTION

According to an embodiment of the present invention, a speed of service system includes a ground layer, a sensor positioned within the ground layer, a radio communicatively coupled to the sensor, a sign controller receiving a signal from the wired radio, and a visual display displaying information obtained by the sensor.

According to another embodiment of the present invention, the speed of service system includes a repeater communicatively coupled to the sensor and the wired radio.

According to yet another embodiment of the present invention, the speed of service system includes a wireless repeater.

According to yet another embodiment of the present invention, the speed of service system includes a wireless sensor.

According to yet another embodiment of the present invention, the speed of service system includes a network store LAN communicatively coupled to the visual display and wired radio.

According to yet another embodiment of the present invention, the speed of service system includes a sign controller that controls the visual display.

According to yet another embodiment of the present invention, the speed of service system includes a data center communicatively coupled to the network store LAN.

According to yet another embodiment of the present invention, the speed of service system includes an access point communicatively coupled to the radio and a network store LAN.

According to yet another embodiment of the present invention, the speed of service system includes a ground layer at least partially covered by a canopy and the visual display is engaged to the canopy.

According to yet another embodiment of the present invention, the speed of service system includes a ground layer, a plurality of sensors positioned within the ground layer, at least one radio communicatively coupled to the sensor, a sign controller receiving a signal from the wired radio, and at least one visual display displaying information obtained by the sensor.

According to yet another embodiment of the present invention, the speed of service system includes a canopy, a plurality of fuel lanes positioned under the canopy, a plurality sensors positioned within the fuel lanes, at least one radio communicatively coupled to the sensor, a sign controller receiving a signal from the wired radio, and at least one visual display displaying information obtained by the sensor.

According to yet another embodiment of the present invention, the speed of service system includes a pump disposed within the fuel lane.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
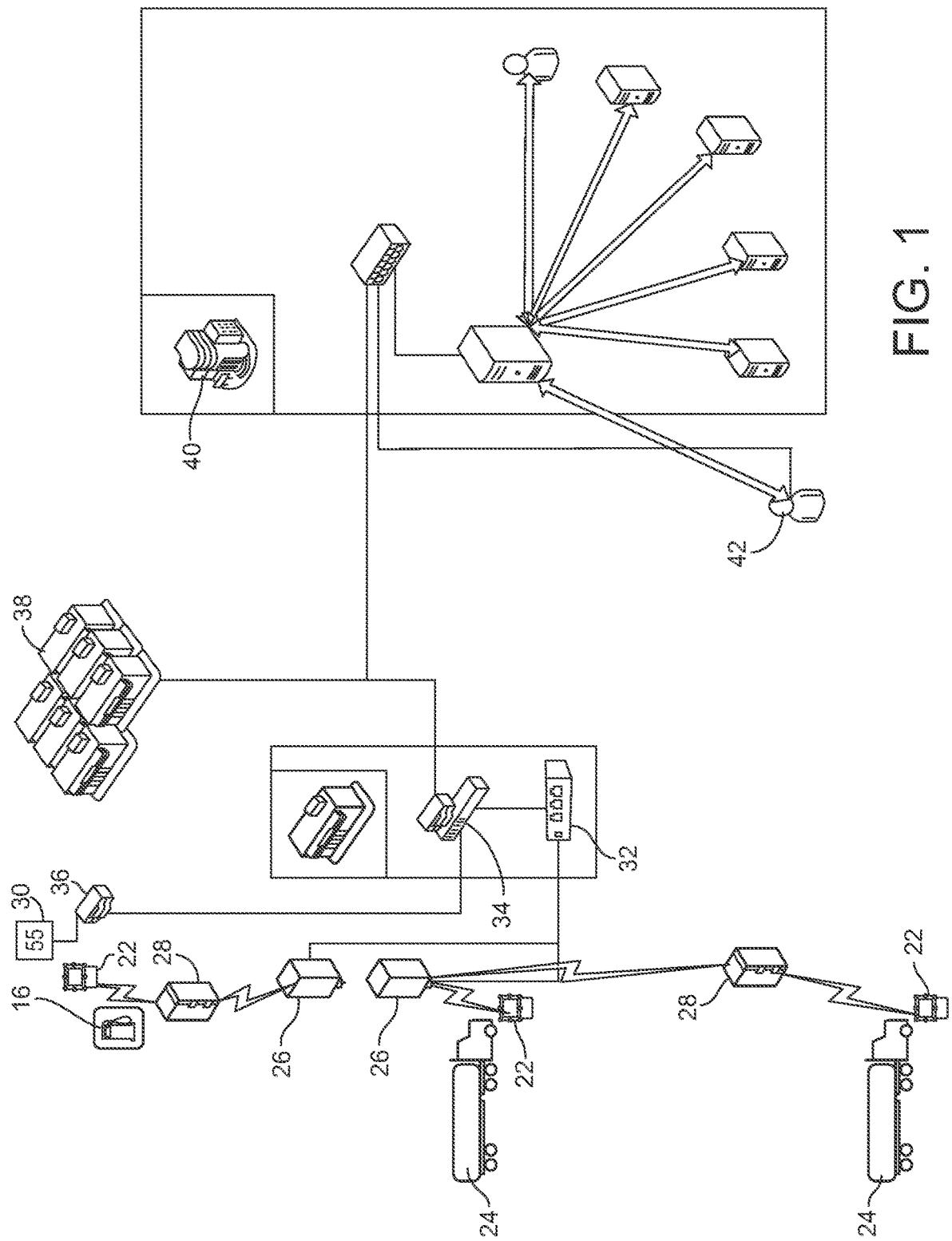
FIG. 1 is a flow diagram of the present invention.

Referring now specifically to the drawings, a speed of service system is illustrated in FIG. 1 and is shown generally at reference numeral 10. The speed of service system 10 includes a fuel lane 12 that consists of an asphalt or a concrete ground layer 14. A pump 16 is positioned near the ground layer 14 and a canopy 18 may cover the ground layer 14. The canopy 18 is engaged to the ground layer 14 by a plurality of posts 20.

Typically, a plurality of fuel lanes 12 are adjacent one another at a travel center or gas station. All of the fuel lanes 12 are usually disposed under a canopy 18 to protect the fuel lane 12 and its user from the elements, such as rain, snow, or direct sunlight. Each fuel lane 12 contains a pump 16, allowing a user to dispense a petroleum product from the pump 16 and into the user's vehicle.

Figure 2:
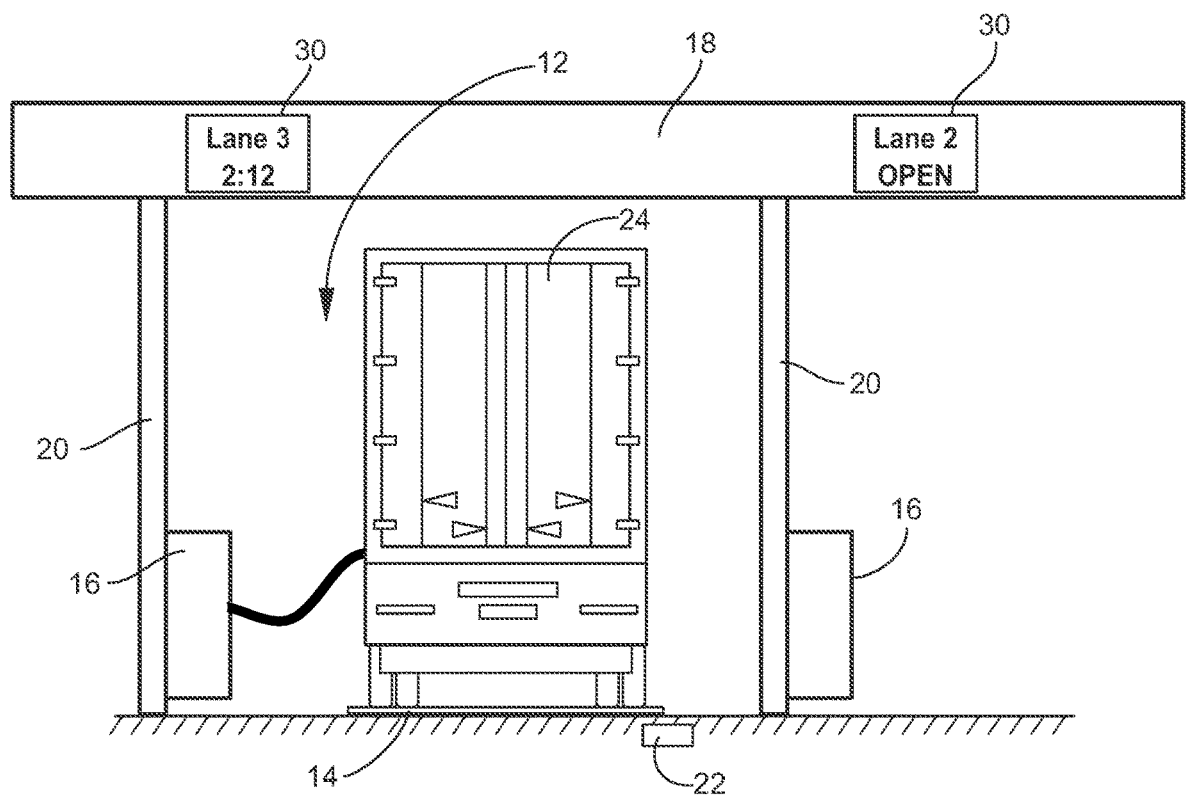
FIG. 2 is a side view of an exemplary embodiment of the present invention of a fuel lane.

A sensor 22 is positioned within the ground layer 14 for sensing the presence and absence of a vehicle, preferably a truck 24. The system 10 preferably contains one sensor 22 in each fuel lane, as shown in FIG. 2. Preferably, the sensor 22 is wireless, but it may be hardwired. The sensor 22 is communicatively coupled to a wired radio 26, through a wireless transmission or a cable engaged to the sensor 22 and the wired radio 26. Alternatively, the sensor 22 may be communicatively coupled to a repeater 28 that is communicatively coupled to a wired radio 26. The sensor 22 can communicate with the repeater 28 wirelessly or be hardwired, through a cable to the repeater or other wireless communication device. The use of a repeater 28 is dependent upon the location of the sensor 22. If a sensor 22 is spaced a distance away from the radio 26 wherein the signal is degraded or likely to be degraded and affect reception, a repeater 28 is used for uninterrupted communication between the sensor 22 and radio 26. The sensor 22 may be battery operated, solar, or hardwired to a power source and mounted to a post 20 on the canopy 18, the canopy 18, a parking lot light, a light pole, etc.

In one embodiment, some sensors 22 within the system 10 may communicate with a repeater 28 and some sensors 22 may communicate directly with the radio 26. The sensors 22 that communicate with the repeater 28 are located a distance away from the radio 26, preventing the sensor 22 from effectively communicating with the radio 26. Therefore, the repeater 28 is needed to allow the sensor 22 to effectively communicate with the radio 26. The sensors 22 that are located at a distance nearer the radio 26 and are able to effectively communicate with the radio 26 do not need to use the repeater 28.

Each fuel lane 12 contains an entrance and an exit, by which it is preferred for the vehicle to enter the fuel lane 12 and exit the fuel lane 12. Each fuel lane 12 contains a visual display 30 in close proximity to the fuel lane 12. Preferably, the visual display 30 is positioned so that it can be viewed easily and unobstructed from the entrance of the fuel lane 12. As illustrated in FIG. 2, the visual display 30 is positioned on the side of the canopy 18, facing a user waiting to enter fuel lane 12. The purpose of this placement is to allow a user waiting to use the fuel lane 12 to easily view the visual display 30. The visual display 30 provides information relevant or related to the fuel lane 12, including, among other things, the fuel lane number. Preferably, the visual display 30 provides a visual indication as to the time a vehicle 24, such as a truck, has entered the fuel lane 12 and an indicated such as the words "Open" or "Closed", indicating whether a user may be able to use the fuel lane 12. For example, if a fuel pump 16 does not have a petroleum product to dispense or it's broken, preventing it from dispensing fuel, the visual display 30 is used to indicate the fuel lane 12 is closed.

The visual display 30 is communicatively coupled to the radio 26 and sensors 22 for providing the data gathered by the sensors 22. The visual display 30 may also directly communicate with the local structure 38, allowing an administrator in the local structure 38 to include messaging on the visual display 30. Messages such as "Open" and "Closed" can be controlled by the administrator in the local structure 38. The visual display 30 may also contain static messaging that is either permanently affixed to the visual display 30 or can be inserted and changed manually on the visual display 30. For example, messages indicating the lane number can be permanently affixed, inserted onto the display, or manually changed on the visual display 30.

The radio 26, which may also consist of two or more radios 26 (including a plurality of radios 26), is communicatively coupled to an access point 32, for example by a Cat5 cable. The access point 32 is coupled to a network store LAN 34 by a Cat5 cable. The network store LAN 34 is wirelessly communicatively coupled to a sign controller 36, or alternatively, the coupling can be hardwired. The sign controller 36 interprets the data received from the sensor 22 and displays information on the visual display 30. The access point 32 and network store LAN 34 are housed within a local structure 38 adjacent the fuel lane 12, pumps 16, and sensors 22. The local structure 38 is preferably inside a store connected to the fuel lane 12. Preferably, the fuel lane 12, canopy 18, and pumps 16 are positioned adjacent the local structure. The local structure 18, among other things, contains items and accessories, found in a travel center or gas station. For example, food items, drinks, coffee machines, driver's lounge, restrooms, and showers.

A centrally located data center 40 is communicatively coupled to the network store LAN 34 of each local structure 38. In this embodiment, the data center 40 monitors, and potentially controls, a plurality of local structures 38 each with its own system 10. Preferably, there are a plurality of local structures 38 each having its own system 10. The centrally located data center 40 monitors each system 10 of each local structure 38.

During use, a vehicle 24, such as a truck, pulls into a fuel lane 12. As the vehicle 24 pulls into the fuel lane 12, the sensor 22 senses the vehicle 24 and sends a signal to the wired radio 26, indicating the presence of a vehicle 24 in the specific fuel lane 12. If the sensor 22 is a distance away from the wired radio 26 that may experience difficulties connecting with the wired radio 26, a repeater 28 may be used as an intermediary, receiving the signal from the sensor 22, and passing the signal to the wired radio 26. The signal is received within the access point 32, and transferred to the network store LAN 34. The network store LAN 34 sends an indicator to the sign controller 36, thus activating the visual display 30 that a vehicle 24 is present in the particular fuel lane 12. An indicator is also sent to the data center 40, capturing the data for the particular local structure 38 for viewing and data storage. Upon receiving a signal that a vehicle 24 has entered the fuel lane 12, the sign controller 36 contains a timer that calculates the amount of time the vehicle 24 enters the fuel lane 12 until the vehicle 24 exits the fuel lane 12. The visual display 30 displays a clock that displays the time as calculated by the sign controller 36, preferably by minutes and seconds.

The visual display 30 is visible for anyone wishing to enter the fuel lane 12, so that they may determine the amount of time the truck 24 has been in the fuel lane 12. Each fuel lane 12 at the local structure 38 contains a visual display 30 and sensor 22.

After the vehicle 24 leaves the fuel lane 12, the sensor 22 sends another signal to the wired radio 26 (or to repeater 28 and then to wired radio 26), indicating the vehicle 24 leaving the specific fuel lane 12. The signal is received within the access point 32, and transferred to the network store LAN 34. The network store LAN 34 sends an indicator to the sign controller 36, stopping the timer, and thus resetting the visual display 30 to "zero," indicating a vehicle 24 is not in the fuel lane 12 and that the fuel lane is "open." Alternatively, instead of displaying a zero or zeros, the visual display 30 may display the word "open" in colored letters, such as green. An indicator is also sent to the data center 40, capturing the data for the particular local structure 38 for viewing and capturing the data and creating a log for the amount of time the truck 24 was in the fuel lane 12. Additionally, the data captured by the data center 40 would indicate the number of lanes open at a particular local structure 38.

While any sensor that may detect the present or absence of a truck, a Sensys Networks MircoRadar sensor has been found to work well with the current system.

The system 10 will allow for remote access by a system monitoring administrator 42. This administrator 42 would be allowed to access the system 10 to collect data or perform updates or repairs to the system 10. The data captured at the data center 40 may be stored and monitored on at least one snap server. The snap server is accessible by the system monitoring administrator 42 and provides data to various operations and systems of a centralized corporate location.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A speed of service system, comprising:
   a fuel lane containing a ground layer and at least one pump for dispensing a petroleum product;
   a sensor positioned within the ground layer for sensing the presence of a vehicle within the fuel lane;
   a radio communicatively coupled to the sensor, the sensor sends a signal to the radio when the sensor senses a vehicle entering the fuel lane;
   a sign controller containing a timer, the sign controller activates the timer upon receipt of the indicator from a network store LAN that the sensor has sensed the presence of a vehicle within the fuel lane and the timer calculates the amount of time elapsed since a vehicle enters each fuel lane; and
   at least one visual display displaying the elapsed time since each vehicle in each fuel lane entered the fuel lane, and when the vehicle exits the fuel lane, the sensor sends another signal to the radio, indicating the vehicle has left the fuel lane, the signal is received within an access point and transferred to the network store LAN, the network store LAN sends an indicator to the sign controller, stopping the timer, and resetting the visual display.

2. A speed of service system according to claim 1, further comprising a repeater communicatively coupled to the sensor and the radio.

3. A speed of service system according to claim 2, wherein the repeater is wireless.

4. A speed of service system according to claim 1, wherein the sensor wirelessly communicates with the radio.

5. A speed of service system according to claim 1, further comprising a network store LAN communicatively coupled to the visual display and the radio.

6. A speed of service system according to claim 5, further comprising a data center communicatively coupled to the network store LAN.

7. A speed of service system according to claim 1, wherein the sign controller controls the visual display.

8. A speed of service system according to claim 1, further comprising an access point communicatively coupled to the radio and a network store LAN.

9. A speed of service system according to claim 1, wherein the ground layer is at least partially covered by a canopy and the visual display is engaged to the canopy.

10. A speed of service system, comprising:
    a plurality of fuel lanes containing a ground layer with each fuel lane containing a pump for dispensing a petroleum product;
    a sensor positioned within the ground layer of each fuel lane for sensing the presence of a vehicle within the fuel lane;
    an access point;
    at least one radio communicatively coupled to the sensor, the sensor sends a signal to the radio when the sensor senses a vehicle entering the fuel lane, the signal is received by the access point and transferred to a network store LAN, the network store LAN is communicatively coupled to a sign controller and sends an indicator to the sign controller, the sign controller contains a timer and activates the timer upon receipt of the indicator from the network store LAN that the sensor has sensed a vehicle entering the fuel lane and the timer calculates the amount of time elapsed since a vehicle enters each fuel lane;
    at least one visual display displaying the elapsed time since each vehicle in each fuel lane entered the fuel lane, and when the vehicle exits the fuel lane, the sensor sends another signal to the radio, indicating the vehicle has left the fuel lane, the signal is received within the access point and transferred to the network store LAN, the network store LAN sends an indicator to the sign controller, stopping the timer, and resetting the visual display.

11. A speed of service system according to claim 10, further comprising a repeater communicatively coupled to the sensor and the radio.

12. A speed of service system according to claim 10, wherein the sign controller controls the visual display.

13. A speed of service system, comprising:
    a plurality of fuel lanes containing a ground layer with each fuel lane containing a pump for dispensing a petroleum product;
    a sensor positioned within the ground layer of each fuel lane for sensing the presence of a vehicle within the fuel lane;
    an access point;
    at least one radio communicatively coupled to the sensor, the sensor sends a signal to the radio when the sensor senses a vehicle entering the fuel lane, the signal is received by the access point and transferred to a network store LAN, the network store LAN is communicatively coupled to a sign controller and sends an indicator to the sign controller, the sign controller contains a timer and activates the timer upon receipt of the indicator from the network store LAN that the sensor has sensed a vehicle entering the fuel lane and the timer calculates the amount of time elapsed since a vehicle enters each fuel lane;

at least one visual display displaying the elapsed time since each vehicle in each fuel lane entered the fuel lane, and when the vehicle exits the fuel lane, the sensor sends another signal to the radio, indicating the vehicle has left the fuel lane, the signal is received within the access point and transferred to the network store LAN, the network store LAN sends an indicator to the sign controller, stopping the timer, and resetting the visual display; and a data center is communicatively coupled to the network store LAN.

* * * * *